United States Patent
Rehman et al.

(10) Patent No.: US 9,630,723 B2
(45) Date of Patent: Apr. 25, 2017

(54) ACOUSTICALLY DIFFUSIVE AUXILARY POWER UNIT INLET DOORS

(71) Applicant: UNITED TECHNOLOGIES CORPORATION, Farmington, CT (US)

(72) Inventors: Farooq Rehman, San Diego, CA (US); James C Napier, San Diego, CA (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 36 days.

(21) Appl. No.: 14/729,689

(22) Filed: Jun. 3, 2015

(65) Prior Publication Data
US 2015/0353203 A1 Dec. 10, 2015

Related U.S. Application Data

(60) Provisional application No. 62/008,932, filed on Jun. 6, 2014.

(51) Int. Cl.
*B64D 41/00* (2006.01)
*B64D 33/02* (2006.01)

(52) U.S. Cl.
CPC ............. *B64D 41/00* (2013.01); *B64D 33/02* (2013.01); *B64D 2033/0213* (2013.01)

(58) Field of Classification Search
CPC ................................ B64D 41/00; B64D 33/02
See application file for complete search history.

(56) References Cited

U.S. PATENT DOCUMENTS

| | | | | | |
|---|---|---|---|---|---|
| 3,821,999 | A * | 7/1974 | Guess | ................. | G10K 11/172 181/296 |
| 4,049,074 | A * | 9/1977 | Kazin | .................... | B64D 33/02 181/284 |
| 4,418,879 | A * | 12/1983 | Vanderleest | .......... | B64D 33/02 137/15.1 |
| 6,272,838 | B1 * | 8/2001 | Harvell | .................. | F02C 7/042 244/58 |
| 6,349,899 | B1 * | 2/2002 | Ralston | .................. | B64D 33/02 244/53 B |
| 7,540,142 | B2 * | 6/2009 | Sheoran | .................. | F02C 7/042 137/15.1 |
| 8,079,550 | B2 * | 12/2011 | Brill | ....................... | B64D 41/00 244/129.4 |
| 8,096,498 | B2 * | 1/2012 | Francisco | ............. | B64D 41/00 244/129.5 |
| 2005/0224635 | A1 * | 10/2005 | Hein | ...................... | B64D 33/02 244/10 |
| 2006/0057951 | A1 * | 3/2006 | Jung | ................. | B60H 1/00564 454/143 |
| 2010/0068036 | A1 * | 3/2010 | Brill | ....................... | B64D 41/00 415/119 |
| 2012/0292455 | A1 * | 11/2012 | Dede | ...................... | B64D 41/00 244/53 B |
| 2014/0335774 | A1 * | 11/2014 | Dorland | ............ | B60H 1/00685 454/139 |

* cited by examiner

*Primary Examiner* — Justin Benedik
(74) *Attorney, Agent, or Firm* — Cantor Colburn LLP

(57) ABSTRACT

An inlet door for an auxiliary power unit includes a door body with opposed interior and exterior surfaces. The interior surface of the inlet door is curved to diffuse sound waves received by the interior surface.

17 Claims, 3 Drawing Sheets

Fig. 1
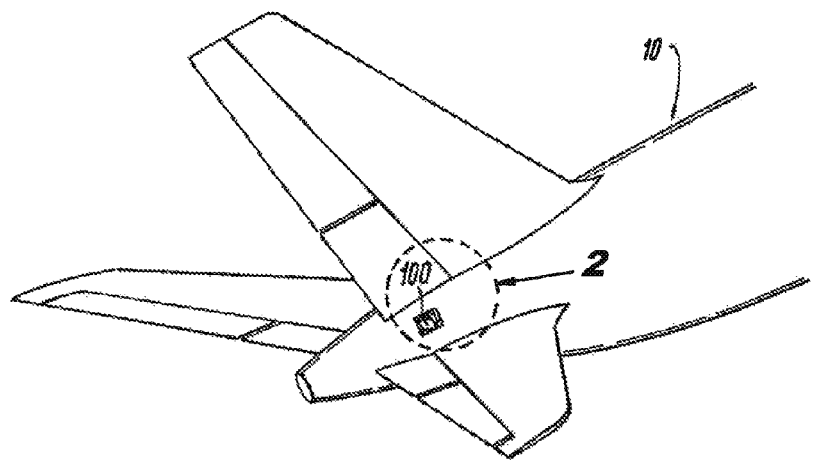
Fig. 3a
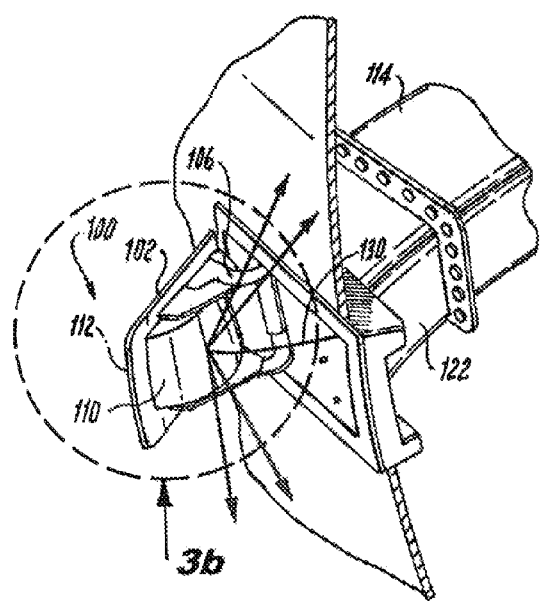
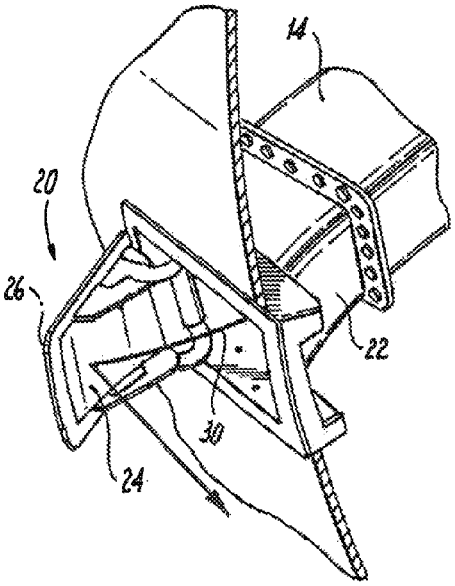
Fig. 2
*(Prior Art)*

ACOUSTICALLY DIFFUSIVE AUXILARY POWER UNIT INLET DOORS

CROSS-REFERENCE TO RELATED APPLICATION

This application claims the benefit of priority under 35 U.S.C. §119(e) to U.S. Provisional Application No. 62/008,932, filed Jun. 6, 2014, which is incorporated herein by reference in its entirety.

BACKGROUND OF THE INVENTION

1. Field of the Invention

The present disclosure relates to auxiliary power units, and more particularly to inlet doors of auxiliary power units.

2. Description of Related Art

Auxiliary power units ("APU") are used in aircraft to provide electrical power and compressed air to various onboard systems. When an aircraft is on the ground, often its main source of electrical power and pneumatic power comes from the APU, e.g., when the main engines are not engaged. Generally, APUs are located in the aft section of the aircraft, at or near the tailcone section, and utilize an air intake system to allow sufficient air flow to travel from an opening in the exterior surface of the airplane through to the APU. Air intake systems typically include an inlet air door to protect the APU from foreign object damage when not in use and/or during ground movement, and to maximize airflow into the APU when performance at altitude is required. Thus, when APU venting is desired, the inlet air door opens, whether on the ground or in flight.

SUMMARY OF THE INVENTION

An inlet door for an auxiliary power unit includes a door body with opposed interior and exterior surfaces. The interior surface of the inlet door is curved to diffuse sound waves received by the interior surface.

In embodiments, the interior surface is convex relative to the door body. Moreover, the interior surface can be curved about a first axis. The interior surface can also be curved about a second axis, e.g., perpendicular to the first axis. The interior surface can be curved to a greater extent than the exterior surface.

The inlet door can further include an acoustic lining to absorb and/or diffract sound waves. The acoustic lining can be made from three dimensional meshes, honeycomb structures, metal foams, feltmetals, perforated sheets and combinations thereof. The acoustic lining can be positioned along the curved interior surface.

An auxiliary power unit system is also disclosed. The system includes an inlet duct in fluid communication with an auxiliary power unit and an inlet door, such as described above, in fluid communication with the inlet duct. The interior surface of the inlet door is curved to diffuse sound waves received by the interior surface away from the inlet duct by scattering the reflected waves.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 1 is a perspective view of an airplane showing the location of an inlet door of an auxiliary power unit constructed in accordance with the present disclosure;

FIG. 2 is a perspective view of the inlet door as in the prior art showing with sound wave reflection indicated schematically;

FIG. 3a is a perspective view of an inlet door of an auxiliary power unit system, showing an interior surface curved with respect to a first axis, in accordance with an embodiment;

DETAILED DESCRIPTION OF THE PREFERRED EMBODIMENTS

Figure 3B:
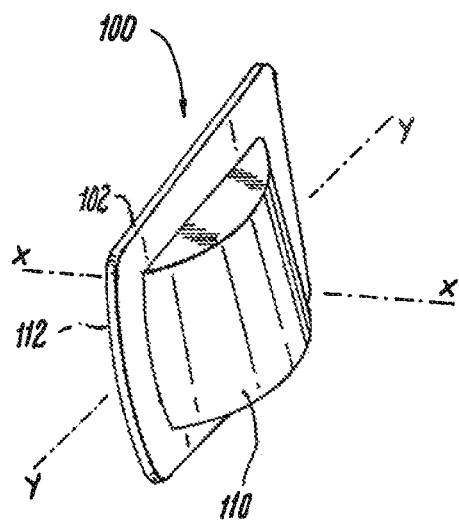
FIG. 3b is a detailed view of the inlet door of FIG. 3a in accordance with an embodiment.
Figure 4A:
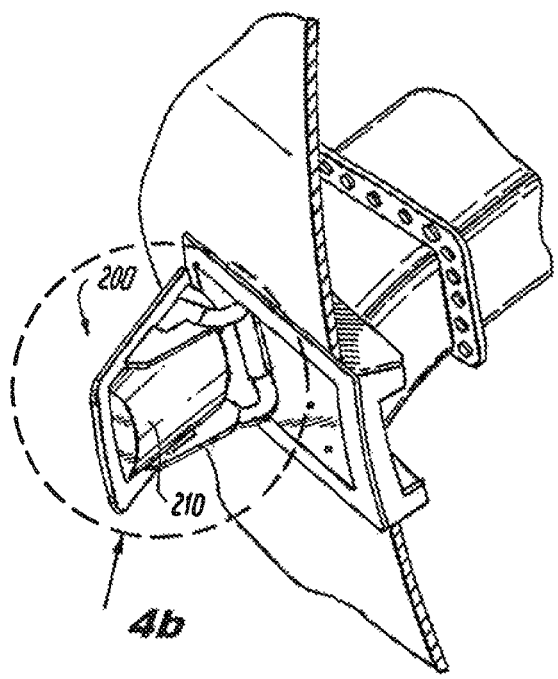
FIG. 4a is a perspective view of an inlet door of an auxiliary power unit system, showing an interior surface curved with respect to a second axis, in accordance with an embodiment.
Figure 4B:
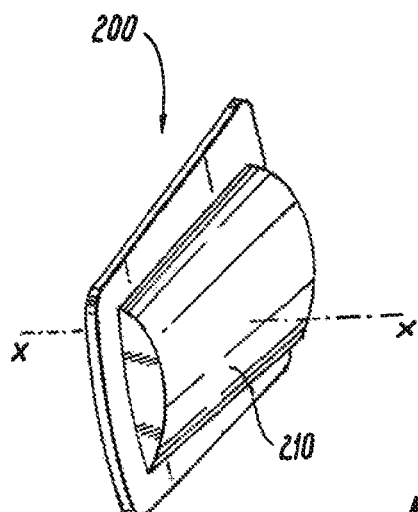
FIG. 4b is a detailed view of the inlet door of FIG. 4a in accordance with an embodiment.

Reference will now be made to the drawings wherein like reference numerals identify similar structural features or aspects of the subject disclosure. For purposes of explanation and illustration, and not limitation, a partial view of an exemplary embodiment of the inlet door of an auxiliary power unit in accordance with an embodiment is shown in FIG. 1 and is designated generally by reference character 100. Other embodiments of inlet doors, or aspects thereof, are provided in FIGS. 3a-5b.

Absorption is the process in which acoustic energy comes in contact with a material that converts the energy into heat. Reflection is the process in which acoustic energy strikes a material and is redirected largely unchanged. Refraction is the process in which acoustic energy bends around or is blocked by objects. Diffusion is the process in which acoustic energy comes in contact with a rigid, non-uniform shape with lots of surface area and scatters in many different directions. Diffusion causes a measurable reduction in acoustic sound pressure level because the energy is spread over a large surface area. When the inlet doors of a typical auxiliary power unit ("APU") are open, the surface of the doors can cause acoustic reflections towards the aircraft service locations and passenger doors, which causes an increase in sound pressure level.

FIG. 1 illustrates an airplane 10 with an APU 114 (shown in FIG. 3) with an inlet door 100. The inlet door 100 is in fluid communication with an inlet duct 122 (shown in FIG. 3) which leads to the APU 114. One purpose of an APU is to provide power to start the main engines. An APU 114 can provide power (electric, pneumatics, and/or hydraulics, depending on the design) to start the aircraft's main engines. The APU 114 can also provide power generation for other aircraft 10 systems before, during, and after main engine startup.

With reference to FIG. 2, an inlet door 20 as known in the prior art is shown. The interior and exterior surfaces 24, 26 of the inlet door 20 are generally flat surfaces. The flat interior surface 24 of the inlet door 20 projects acoustic reflections towards the noise sensitive passenger doors and service locations, resulting in increased noise at those locations. FIG. 2 schematically illustrates a sound wave 30 that is reflected from the flat interior surface 24.

FIG. 3*a* illustrates an embodiment of the inlet door 100 in accordance with the present disclosure. The inlet door 100 is constructed to diffuse sound waves received by an interior surface. The inlet door 100 includes a door body 102 with opposed interior and exterior surfaces 110 and 112, respectively. A hinge member 106 is operatively connected to the door body 102 for hinging the door body 102 between an open and closed position. As shown in FIG. 3*b*, the interior surface 110 of the inlet door is curved about a single axis, e.g., an x-axis parallel with the hinge member 106. In embodiments, the interior surface 110 is curved to a greater extent than the exterior surface 112. This curvature of the interior surface diffuses sound waves 130 received by the inlet door 100, e.g., from the APU 114. More specifically, the interior surface 110 acts to scatter the approaching sound waves 130 instead of reflecting the sound waves 130 toward the aircraft. Further, the interior surface 110 diffuses sound waves 130 away from the inlet duct 122. The result is less sound energy being directed towards noise sensitive locations.

Figure 5A:
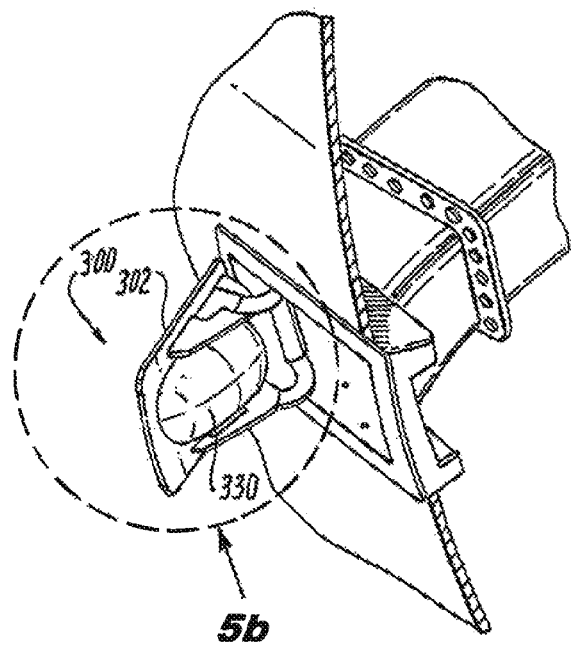
FIG. 5a is a perspective view of an inlet door showing the interior surface curved with respect to first and second axes, in accordance with an embodiment.
Figure 5B:
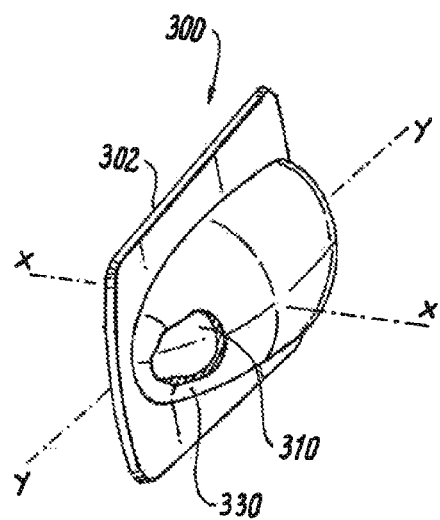
FIG. 5b is a detailed view of the inlet door of FIG. 5a in accordance with an embodiment.

With continued reference to FIG. 3*b*, the interior surface 110 of the inlet door 100 is convex relative to the door body 102. FIG. 3*b* shows the interior surface 110 is curved about a first axis. In other words, the interior surface 110 is curved about a single axis, i.e., interior surface 110 is 2-dimensionally convex. It is also contemplated that the interior surface 110 may be curved about any other axis. For example, with reference to FIGS. 4*a* and 4*b*, interior surface 210 of inlet door 200 is curved about a second axis. In yet other embodiments, the interior surface 210 may be curved about two axes, e.g., perpendicular to one another as shown in FIGS. 5*a*-5*b*, i.e., interior surface 210 is 3-dimensionally convex. While the interior surface 110 is shown as both a 2-dimensional and 3-dimensional convex surface, it is contemplated that other geometries may be incorporated into the interior surface to diffuse sound waves.

FIG. 5*b* also illustrates an acoustic lining 230 which may be positioned surrounding the interior surface 210. The acoustic lining 230 further absorbs and/or diffracts the sound waves received by the interior surface 210. The acoustic lining 230 is made from three dimensional meshes, honeycomb structures, metal foams, feltmetals, perforated sheets or a combination thereof. The acoustic lining 230 is positioned along the interior surface 210. More specifically, the acoustic lining 230 is positioned inwards of the interior surface 210. In certain embodiments, the acoustic lining 230 may be positioned within the door body 202. In yet other embodiments, the entire door body 202 may be made up of the acoustic lining. Although the acoustic lining 230 is shown and described for the 3-dimensional embodiment of FIGS. 5*a*-5*b*, it is understood that the acoustic lining may also be included in the 2-dimensional embodiments of FIGS. 3*a*-4*b*.

The methods and systems of the present disclosure, as described above and shown in the drawings, provide for an inlet door for an APU with superior properties including improved diffusion of sound waves. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. An auxiliary power unit for an aircraft, comprising:
an inlet door having a door body with opposed interior and exterior surfaces, wherein a portion of the interior surface located at a distance from a periphery of the door body protrudes continuously away from the interior surface of the door body and wherein the portion of the interior surface is curved and configured to diffuse sound waves received by the interior surface.

2. The inlet door of claim 1, wherein the portion of the interior surface is curved about a first axis.

3. The inlet door of claim 2, wherein the portion of the interior surface is curved about a second axis.

4. The inlet door of claim 1, wherein the portion of the interior surface is convex relative to the door body.

5. The inlet door of claim 1, wherein the portion of the interior surface is curved to a greater extent than the exterior surface.

6. The inlet door of claim 1, further including an acoustic lining to absorb and/or diffract the sound waves.

7. The inlet door of claim 6, wherein the acoustic lining is made from at least one of three dimensional meshes, honeycomb structures, metal foams, feltmetals and perforated sheets.

8. The inlet door of claim 6, wherein the acoustic lining is positioned along the portion of the interior surface.

9. An auxiliary power unit system, comprising:
an auxiliary power unit;
an inlet duct in fluid communication with the auxiliary power unit; and
an inlet door in communication with the inlet duct, comprising:
a door body with opposed interior and exterior surfaces, wherein a portion of the interior surface located at a distance from a periphery of the door body protrudes continuously away from the interior surface of the door body and wherein the portion of the interior surface is curved and configured to diffuse sound waves received by the interior surface.

10. The system of claim 9, wherein the portion of the interior surface diffuses sounds waves away from the inlet duct.

11. The system of claim 9, wherein the portion of the interior surface is curved about a first axis.

12. The system of claim 11, wherein the portion of the interior surface is curved about a second axis.

13. The system of claim 9, wherein the portion of the interior surface is convex relative to the door body.

14. The system of claim 9, wherein the portion of the interior surface is curved to a greater extent than the exterior surface.

15. The system of claim 9, wherein the inlet door further includes an acoustic lining to absorb and/or diffract the sound waves.

16. The system of claim 15, wherein the acoustic lining is made from at least one of three dimensional meshes, honeycomb structures, metal foams, felt metals and perforated sheets.

17. The system of claim 15, wherein the acoustic lining is positioned along the portion of the interior surface.

* * * * *